J. R. ENGLAND.
HARVESTING MACHINE.
APPLICATION FILED JAN. 27, 1914.
1,106,196.
Patented Aug. 4, 1914.
2 SHEETS—SHEET 1.
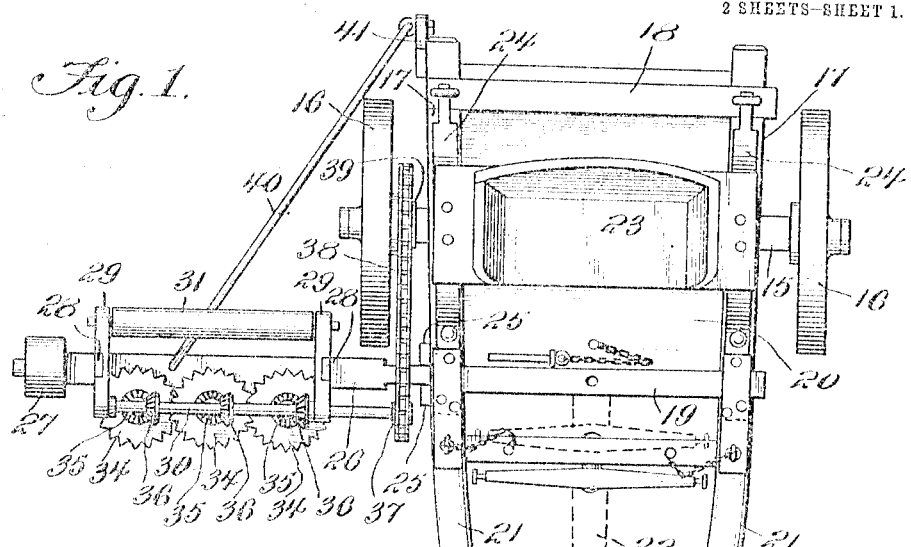
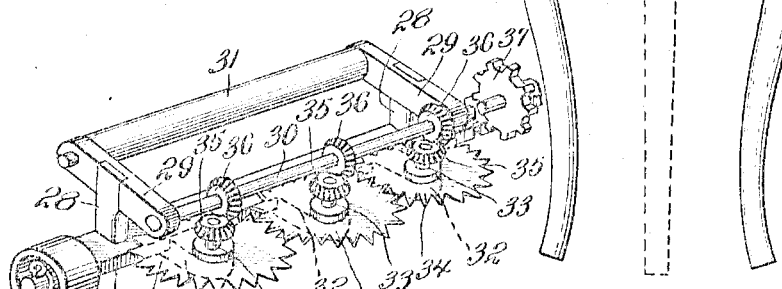
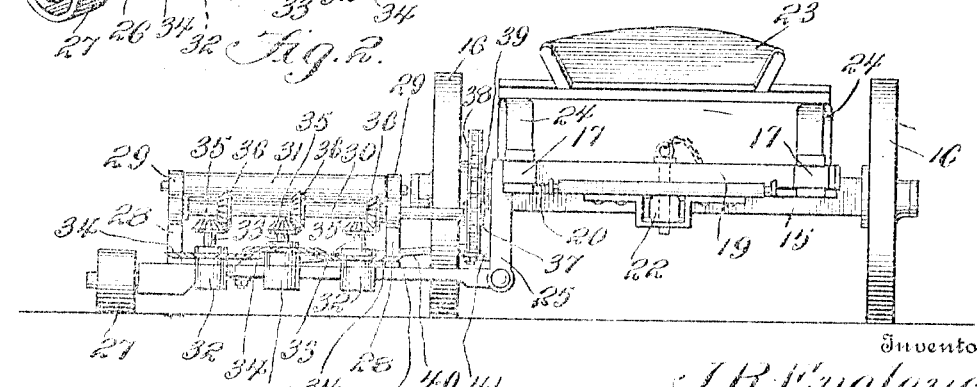
Inventor
J. R. England
by Victor J. Evans
Attorney
Witnesses

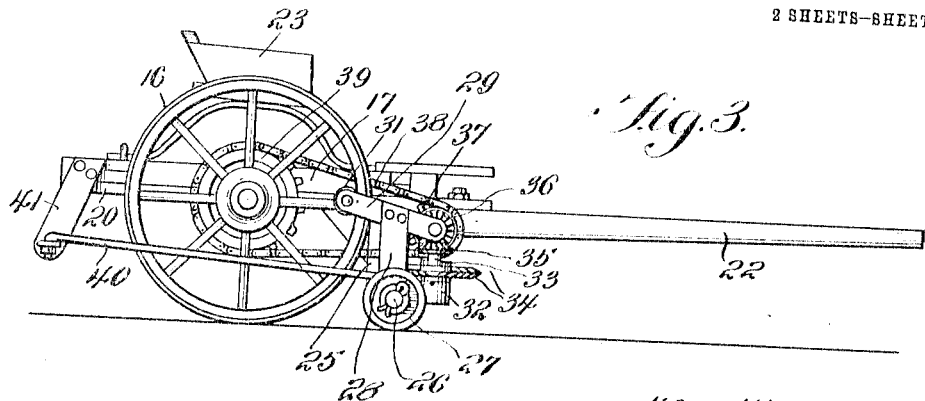
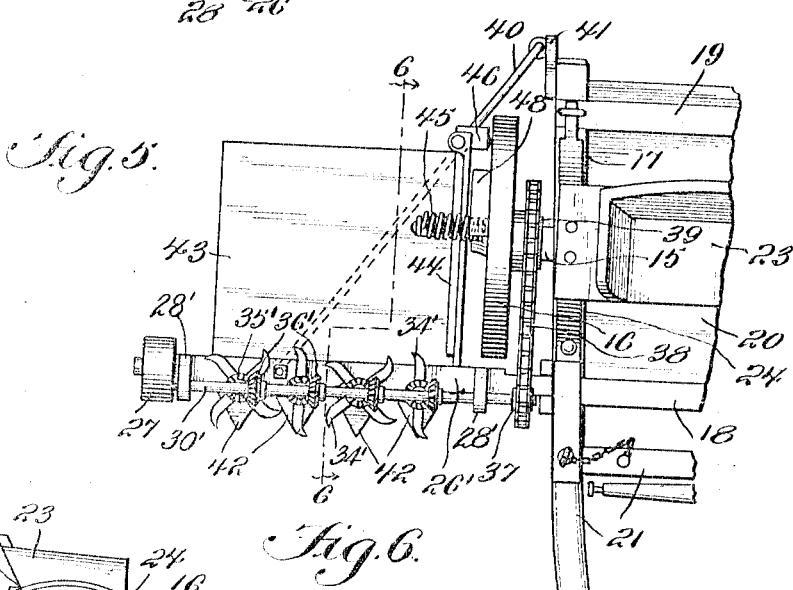
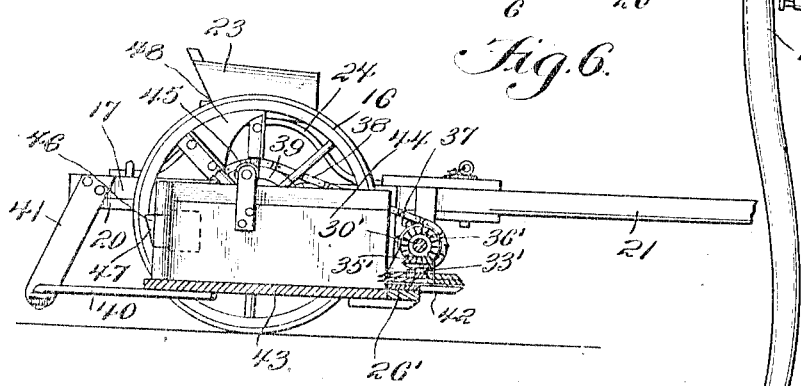

UNITED STATES PATENT OFFICE.

JAMES R. ENGLAND, OF COLUMBUS, GEORGIA, ASSIGNOR OF ONE-THIRD TO JEFFERSON D. MILFORD, OF COLUMBUS, GEORGIA.

HARVESTING-MACHINE.

1,106,196.    Specification of Letters Patent.    Patented Aug. 4, 1914.

Application filed January 27, 1914. Serial No. 814,819.

*To all whom it may concern:*

Be it known that I, JAMES R. ENGLAND, a citizen of the United States, residing at Columbus, in the county of Muscogee and State of Georgia, have invented new and useful Improvements in Harvesting-Machines, of which the folowing is a specification.

This invention relates to harvesting machines, and it has particular reference to a machine for cutting sugar cane and the like, although with simple modifications it may be utilized for cutting grass, grain and the like.

The invention has for its object to produce a simple and efficient machine embodying in its construction a two-wheeled cart, hangers or brackets associated therewith and cutting mechanism adapted to be supported by said hangers or brackets, together with means for transmitting motion to the cutting mechanism from one of the cart wheels.

The invention further consists in the improved construction of the cutting mechanism for cutting cane and the like.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings, Figure 1 is a top plan view of a cane harvesting machine constructed in accordance with the invention. Fig. 2 is a front view of the same. Fig. 3 is a side elevation. Fig. 4 is a perspective detail view of the cutting mechanism detached. Fig. 5 is a top plan view illustrating a modification which is employed for cutting grain, a portion of the cart structure being omitted. Fig. 6 is a vertical sectional detail view taken on the line 6—6 in Fig. 5.

Corresponding parts in the several figures are denoted by like characters of reference.

An axle 15 having ground wheels 16 supports a frame comprising side members 17 and front and rear bars 18 and 19, said frame coöperating with the axle to support a floor or platform 20. Draft means, such as thills 21 or a tongue 22, may be connected with the frame in such a manner as to be conveniently interchanged or detached to provide for the attachment of one or more draft animals. A seat 23 is supported on springs 24 mounted on the side members of the frame.

The frame is provided at one side thereof with a depending bracket member 25 carrying at its lower end a pivotally supported bar 26 having at its outer end a ground engaging wheel 27. The bar 26 which may be regarded as constituting the main frame member of the cutting apparatus is provided with uprights 28 supporting cross heads 29 at the forward ends of which a shaft 30 is supported for rotation. The rearward ends of the cross heads support a roller 31. The frame bar 26 is provided at intervals with forwardly extending lugs 32 in which are stepped vertical shafts 33, carrying toothed cutting disks 34 which are arranged so as to mutually overlap each other and also to project forwardly of the frame bar and the bearing lugs. The shafts 33 are provided at their upper ends with bevel pinions 35 meshing with bevel pinions 36 on the shaft 30. The latter is provided at its inner end, adjacent to the cart frame, with a sprocket wheel 37 connected by a chain or link belt 38 with a sprocket wheel 39 associated with one of the cart wheels 16 from which motion may thus be transmitted to the rotary cutters. The frame bar 26 is connected by a brace rod 40 with a bracket 41 depending from the rear end of one of the side members 17 of the frame for the purpose of. bracing the cutting apparatus against rearward strain.

Under the modified construction illustrated in Figs. 5 and 6 of the drawings, the frame bar 26 of the cutting apparatus, here designated 26', is provided with forwardly extending triangular knives or cutters 42, and bearings are provided for vertical shafts 33' carrying cutters 34', said shafts being driven substantially in the manner previously described by interengaging bevel pinions 35', 36', the latter being mounted on shaft 30', which is supported on uprights 28'. The roller 31 is, however, omitted, and in place thereof a table or platform 43 is supported on the brace rod 40. A sweep or rake 44 is pivoted near the rear end of the platform 43, the front end of said rake being actuated in the direction of the cart by means of a spring 45; said rake is also provided with a crank 46 having a cam face 47 adapted to be engaged by a tappet 48 which is connected with one of the ground wheels 16 so that by the action thereof as the wheel rotates, the rake or sweep will be actuated to sweep the grain rearwardly off the platform.

From the foregoing description, taken in connection with the drawings, it will be seen that I have provided a harvesting machine of extremely simple construction which may be utilized, with slight alterations, either for cutting cane, corn, grain, grass or other products. Furthermore, during the season when a harvesting machine is not required, the cutting apparatus and the brackets supporting the same may be detached, leaving a cart which may be conveniently utilized as such.

Having thus described the invention, what is claimed as new, is:—

1. In a harvesting machine, a frame having supporting wheels, a sprocket wheel associated with one of said wheels, a bar connected hingedly with the frame in advance of said wheel, a brace rod connecting said bar with the frame in rear of said wheel, and cutting apparatus mounted on the bar, said cutting apparatus including a plurality of upright shafts having rotary cutters, uprights rising from the bar, a substantially horizontal shaft supported by said uprights, interengaging bevel pinions on the upright shafts and the horizontal shaft, a sprocket wheel on the horizontal shaft, and a chain connecting said sprocket wheel with the sprocket wheel associated with the supporting wheel of the frame.

2. In a harvesting machine, a wheel supported frame, a bar connected hingedly with the frame and having a ground wheel at its outer end, vertical cutter carrying shafts carried by the bar, uprights mounted on the bar and having cross heads, a horizontal shaft journaled in the forward ends of the cross heads, interengaging bevel gears on the horizontal shaft and on the cutter carrying shafts, means for transmitting motion to the horizontal shaft from a supporting wheel of the frame, and a roller supported at the rear ends of the cross heads.

In testimony whereof I affix my signature in presence of two witnesses.

JAMES R. ENGLAND.

Witnesses:
  JNO. R. HOLLIS,
  JNO. K. HARRIS.

---

Copies of this patent may be obtained for five cents each, by addressing the "Commissioner of Patents, Washington, D. C."